United States Patent
Chung et al.

(10) Patent No.: US 8,317,384 B2
(45) Date of Patent: Nov. 27, 2012

(54) LIGHT GUIDE FILM WITH CUT LINES, AND OPTICAL KEYPAD USING SUCH FILM

(75) Inventors: Muh Fong Chung, Bukit Jambul (MY);
Sian Tatt Lee, Georgetown (MY);
Choon Guan Ko, Sungai Dua (MY);
Fook Chuin Ng, Taman Bayu (MY)

(73) Assignee: Intellectual Discovery Co., Ltd., Seoul (KR)

( * ) Notice: Subject to any disclaimer, the term of this patent is extended or adjusted under 35 U.S.C. 154(b) by 283 days.

(21) Appl. No.: 12/421,959

(22) Filed: Apr. 10, 2009

(65) Prior Publication Data

US 2010/0258419 A1    Oct. 14, 2010

(51) Int. Cl.
*F21V 7/04* (2006.01)
(52) U.S. Cl. ......... 362/607; 362/620; 362/626; 362/560
(58) Field of Classification Search .................. 362/299, 362/558, 607, 600, 23, 620, 626, 560; 200/314
See application file for complete search history.

(56) References Cited

U.S. PATENT DOCUMENTS

| | | | | |
|---|---|---|---|---|
| 2,900,949 A * | 8/1959 | Baker | | 116/288 |
| 3,043,947 A * | 7/1962 | Albinger, Jr. | | 362/634 |
| 4,141,058 A * | 2/1979 | Mizohata et al. | | 362/558 |
| 4,249,231 A * | 2/1981 | Decaux | | 362/614 |
| 4,349,705 A * | 9/1982 | Kuhfus | | 379/361 |
| 5,053,928 A * | 10/1991 | Pasco | | 362/24 |
| 5,618,096 A * | 4/1997 | Parker et al. | | 362/629 |
| 5,746,493 A * | 5/1998 | Jonsson et al. | | 362/602 |
| 5,890,796 A * | 4/1999 | Marinelli et al. | | 362/307 |
| 6,454,452 B1 * | 9/2002 | Sasagawa et al. | | 362/561 |
| 7,093,968 B2 * | 8/2006 | Hsueh et al. | | 362/606 |
| 7,411,142 B2 | 8/2008 | Jung et al. | | |
| 7,470,054 B2 * | 12/2008 | Lee | | 362/625 |
| 7,503,683 B2 * | 3/2009 | Liu | | 362/616 |
| 7,635,819 B2 * | 12/2009 | Lee et al. | | 200/313 |
| 2003/0063458 A1 * | 4/2003 | Chien et al. | | 362/31 |
| 2004/0125589 A1 * | 7/2004 | Sung | | 362/31 |
| 2006/0254894 A1 * | 11/2006 | Jung et al. | | 200/314 |
| 2007/0012553 A1 * | 1/2007 | Lee et al. | | 200/310 |

(Continued)

FOREIGN PATENT DOCUMENTS

JP    406222217 A  *  8/1994

(Continued)

*Primary Examiner* — Ismael Negron
(74) *Attorney, Agent, or Firm* — Fox Rothschild LLP

(57) ABSTRACT

A light guide includes a light interface surface, top and bottom surfaces, a surface feature pattern, and a cut line. The light interface surface receives light into the light guide from a light source. The light received through the light interface surface reflects according to total internal reflection (TIR) within the light guide between portions of the top and bottom surfaces. The surface feature pattern disrupts the TIR and scatters at least some of the light outside of at least one surface of the top and bottom surfaces. The cut line redirects at least some of the light from a first direction to a second direction within the light guide. The first direction is a direction other than towards the surface feature pattern, while the second direction is a direction substantially towards the surface feature pattern. The light guide may back-illuminate an optical keypad with a plurality of push buttons.

20 Claims, 8 Drawing Sheets

U.S. PATENT DOCUMENTS

| | | | |
|---|---|---|---|
| 2007/0091640 A1* | 4/2007 | Kim et al. | 362/612 |
| 2007/0240973 A1* | 10/2007 | Lee et al. | 200/314 |
| 2008/0053800 A1* | 3/2008 | Hoyle | 200/310 |
| 2008/0101083 A1 | 5/2008 | Lee et al. | 362/610 |
| 2008/0225507 A1* | 9/2008 | Lee et al. | 362/23 |
| 2008/0285256 A1* | 11/2008 | Mezouari et al. | 362/23 |

FOREIGN PATENT DOCUMENTS

| | | |
|---|---|---|
| WO | 2007100180 | 9/2007 |
| WO | 2007102633 | 9/2007 |
| WO | 2008140135 | 11/2008 |

\* cited by examiner

LIGHT GUIDE FILM WITH CUT LINES, AND OPTICAL KEYPAD USING SUCH FILM

BACKGROUND

Mobile computing devices such as cellular telephones (cell phones) and personal digital assistants (PDAs) demand very high functional performance in relatively small packaging. Similar demands are placed on the aesthetics and appearance of such devices. An optical keypad is one component within a mobile computing device that requires both high functionality and appearance. To provide a high quality appearance and increased functionality, many keypads are backlit so that the characters on the individual keys are illuminated and easy to read. There are two basic forms of backlighting: direct and indirect.

Conventionally, direct backlighting implements several light emitting diodes (LEDs) mounted directly behind the keypad. These LEDs emit light directly towards the back of the keys, so that a portion of the emitted light passes through translucent portions (e.g., the characters) of the keys. While direct backlighting can provide good backlighting for the keypad, direct illumination is typically expensive because many LEDs are distributed behind the keypad. Also, direct backlighting typically consumes a significant amount of power because of the number of LEDs that are used to generate the backlight illumination.

In contrast to direct backlighting, conventional indirect backlighting uses one or more LEDs mounted at an edge of a light guide behind the keypad. The LEDs emit light into the light guide, which transfers the light through total internal reflection (TIR) across the length and/or width of the keypad. In general, TIR keeps all of the light inside the light guide, so that the light can travel across the length and/or width of the keypad, as long as the light is reflected at relatively large angles (i.e., angles of incidence which are larger than the critical angle, as measured from the surface normal) within the light guide. However, there is a balance between facilitating TIR and allowing some light to escape from the light guide in order to provide backlight illumination for the keypad. If all of the light were to reflect inside the light guide through TIR, then there would be no light to illuminate the keypad. Conversely, if none of the light reflects inside the light guide, then the light would not reach the far side of the light guide and the keypad, and the backlight illumination of the keypad would be imbalanced with bright spots close to the LEDs and dark spots away from the LEDs. Hence, some of the light inside the light guide should be internally reflected, while the remaining light uniformly exits the light guide at the various key locations.

Both direct and indirect backlighting arrangements can suffer from inadequate illumination. In particular, some arrangements result in relatively low brightness because of limitations in the beam distribution pattern of the LEDs. In other words, the LEDs have limited beam distribution patterns, which makes uniform backlighting difficult to achieve, especially in indirect backlighting arrangements where the LEDs are located around the perimeter of the light guide and keypad.

One conventional way to improve the light distribution uniformity is to use surface feature patterns which are aligned with the individual keys of the keypad. The surface feature patterns are typically groups of raised or depressed surface features which cause the light to scatter in an approximately diffuse manner. However, such surface feature patterns can be insufficient to provide sufficient uniformity, especially for areas that are outside of the limited beam distribution pattern of the LEDs.

Another conventional way to increase light distribution uniformity is to add an adhesive to the surface of the light guide, similar to a surface feature pattern. However, adding adhesives can increase the cost of production of the device. In particular, the process of applying adhesives is not suitable for mass production. Also, it is difficult using adhesives to control the consistency of the brightness within the light guide.

Another conventional way to increase light distribution uniformity is to add serrations in front of the LEDs. Specifically, the serrations present a non-planar surface for the light to enter the light guide. The non-planar nature of the serrations causes the light to distribute the light across a wider angle within the light guide, because the serrations direct some of the light toward the near corners (i.e., dark zones) of the light guide. However, consistently implementing serrations in the proper locations is difficult because it is hard to control the serration tooling after running for some period. In particular, the shape of the serration tooling easily wears over time due to the small and irregular size of the serration tooling.

Another conventional way to increase light distribution uniformity is to use higher intensity LEDs, or to include more LEDs. However, these solutions increase the cost of production of the device.

SUMMARY

Embodiments of an apparatus are described. In one embodiment, the apparatus is a light guide for an optical keypad. An embodiment of the light guide includes a light interface surface, top and bottom surfaces, a surface feature pattern, and a cut line. The light interface surface receives light into the light guide from a light source. The light received through the light interface surface reflects according to total internal reflection (TIR) within the light guide between portions of the top and bottom surfaces. The surface feature pattern disrupts the TIR and scatters at least some of the light outside of at least one surface of the top and bottom surfaces. The cut line redirects at least some of the light from a first direction to a second direction within the light guide. The first direction is a direction other than towards the surface feature pattern, while the second direction is a direction substantially towards the surface feature pattern. Other embodiments of the apparatus are also described.

Embodiments of a system are also described. In one embodiment, the system is an optical keypad system for an electronic computing device. An embodiment of the optical keypad system includes a keypad, a light guide film, and a light source. The keypad includes a plurality of push buttons corresponding to a plurality of inputs. At least a portion of the keypad is at least partially translucent. The light guide film is located approximately adjacent to a back side of the keypad. In one embodiment, the light guide film includes a light interface surface, a surface feature pattern, and a cut line. The light interface surface receives light into the light guide film. The surface feature pattern is disposed on at least one surface of the light guide film approximately parallel to the back side of the keypad. The surface feature pattern disrupts total internal reflection (TIR) within the light guide film and scatters at least some of the light outside of the light guide film towards the keypad. The cut line redirects at least some of the light from a first direction to a second direction within the light guide film. The first direction is a direction other than towards the surface feature pattern, while the second direction is a direction substantially towards the surface feature pattern. The light source emits the light towards the light interface surface of the light guide film. Other embodiments of the system are also described.

Embodiments of a method are also described. In one embodiment, the method is a method for making a light guide for backlighting an optical keypad. An embodiment of the method includes forming a light guide film from a substantially translucent film. The light guide film includes a light interface surface to receive light from a light source. The method also includes forming a surface feature pattern on a surface of the substantially translucent film. The surface feature pattern disrupts total internal reflection (TIR) of light within the light guide film and scatters at least some of the light outside of the light guide film. The method also includes forming a cut line in the light guide film. The cut line redirects at least some of the light from a first direction to a second direction within the light guide film. The first direction is a direction other than towards the surface feature pattern, while the second direction is a direction substantially towards the surface feature pattern. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

While many embodiments are described herein, at least some of the described embodiments facilitate increased backlight illumination for an optical keypad system, compared with conventional optical keypad systems. In order to increase keypad brightness, some embodiments described herein implement one or more cut lines close to a desired area of backlight illumination, for example, in the vicinity of a button or key on the keypad. Each cut line is a physical depression, or channel, in a surface of the light guide film. In some embodiments, the cut lines may be at a right angle, relative to the propagation direction of light within the light guide film. At some angles, the cut lines act as mirrors to reflect incident light back towards the desired location of backlight illumination in order to supplement the incident light from the light source. Alternatively, the cut lines may direct light to "dark" areas outside of the normal beam distribution pattern of the light source that is used to illuminate the light guide film. Although the specific benefits of each embodiment may vary, some embodiments may offer an increase of approximately 30% to 40% in brightness of the backlight illumination due to the reflected light from the cut lines. Additionally, since the cut lines do not require additional components (e.g., more light sources) within the optical keypad system, embodiments which use cut lines can benefit from increased backlight illumination at relatively low cost. Also, the use of cut lines can maintain optical performance with less power consumption or, alternatively, improve optical performance with the same amount of power consumption as conventional backlight illumination devices.

The shapes and sizes of the cut lines can vary greatly depending on the purpose of each cut line and the type of light guide in which the cut line is implemented. In some embodiments, the cut lines may be implemented by cutting the light guide by a die cut in knife type. In other embodiments, other methods and tools may be used to form the cut lines in the light guide. The cut lines may be linear or curvilinear.

Figure 1A:
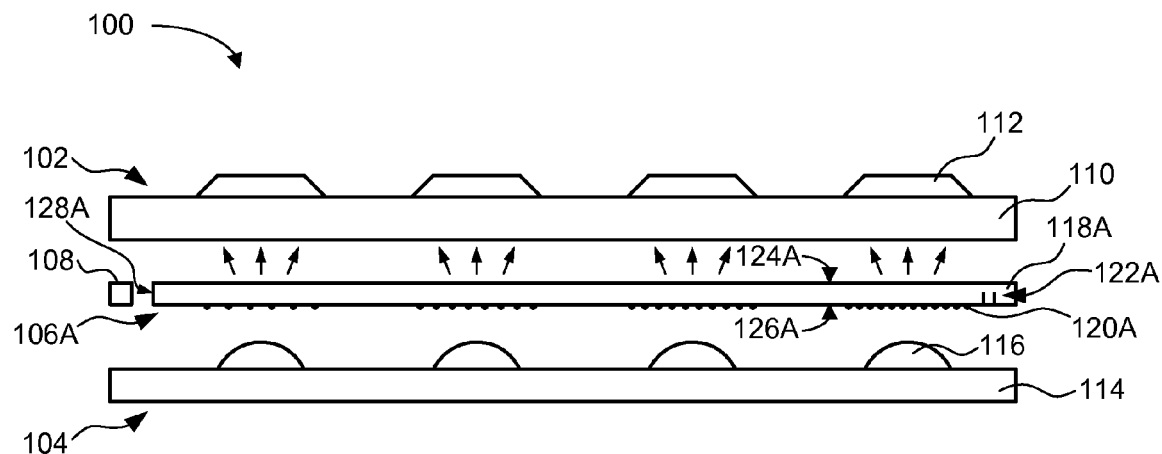
FIG. 1A depicts an exploded schematic sectional diagram of one embodiment of an optical keypad system.

FIG. 1A depicts an exploded schematic sectional diagram of one embodiment of an optical keypad system 100. Embodiments of the optical keypad system 100 may be implemented in various types of mobile electronic computing devices such as cellular telephones (cell phones) and personal digital assistants (PDAs). Additionally, some embodiments of the optical keypad system 100 may be implemented in other types of portable or non-portable electronic devices.

The illustrated optical keypad system 100 includes a keypad 102, a switch circuit 104, a light guide 106A, and a light source 108. Although the optical keypad system 100 is shown and described with certain components and functionality, other embodiments of the optical keypad system 100 may include fewer or more components to implement less or more functionality.

In general, the keypad 102 provides a tactile interface for a user to contact and make various input selections such as alphanumeric or symbolic selections. The optical keypad system 100 described herein is not limited to any particular types of input selections. To facilitate such input selections, the keypad 102 includes a base layer 110 and raised portions 112. Each of the raised portions corresponds to one or more input selections. Other embodiments may use a keypad 102 which does not have raised portions or which has depressed portions corresponding to the input selections.

The switch circuit 104 includes a substrate 114 and various switching devices 116 which are aligned with the keys of the keypad 102. The switching devices 116 may be any type of switching devices, including dome switches or other mechanical, electromechanical, or optical switching devices. Upon depression of a key on the keypad 102, the corresponding switching device 116 is activated to generate a switching signal indicative of the key that is depressed.

The light guide 106A is interposed between the keypad 102 and the switch circuit 104 to provide backlight illumination for the keypad 102. In one embodiment, the light source 108 emits light to illuminate the light guide 106A, which propagates the light by total internal reflection (TIR) across the length and/or width of the keypad 102. More specifically, the light source 108 emits light into the light guide 106A through a light interface surface 128A of the light guide 106A. The light source 108 may be any type of light source, including a light emitting diode (LED), a laser, or another type of light source. Although the optical keypad system 100 is shown with a single light source 108, other embodiments may include more than one light source.

The illustrated light guide 106A includes a substantially translucent layer 118A, multiple surface feature patterns 120A, and multiple cut lines 122A. The substantially translucent layer 118A has a top surface 124A and a bottom surface 126A, which are in corresponding major planes of the substantially translucent layer 118A, at least when the substantially translucent layer 118A is disposed in a relatively flat configuration (i.e., not bent or deformed). The substantially translucent layer 118A propagates light internally through TIR between the top and bottom surfaces 124A and 126A of the substantially translucent layer 118A.

In some embodiments, the substantially translucent layer 118A is a flexible film that conforms to the shape of the back side of the keypad 102. The translucent layer 118A may be fabricated from any number of materials, including but not limited to polycarbonate (PC), polyurethane (PU), polyethylene terephthalate (PET), or acrylic glass (polymethyl methacrylate ((PMMA)). Additionally, the thickness of the translucent layer 118A may vary, although some examples of thicknesses are 0.1 mm, 0.125 mm, 0.2 mm, 0.25 mm, 0.3 mm, 0.38 mm, 0.5 mm, 0.6 mm, 0.8 mm, and 1.0 mm. Other embodiments may use another type of flexible or semi-flexible material and/or have other physical dimensions.

The surface feature patterns 120A of the light guide 106A are generally located at one or both surfaces of the substantially translucent layer 118A. In the depicted embodiment, the surface feature patterns 120A are located on the bottom surface 126A of the substantially translucent layer 118A. However, other embodiments may include surface feature patterns 120A on the top surface 124A of the substantially translucent layer 118A instead of, or in addition to, the surface feature patterns 120A on the bottom surface 124A of the substantially translucent layer 118A.

Figure 1B:
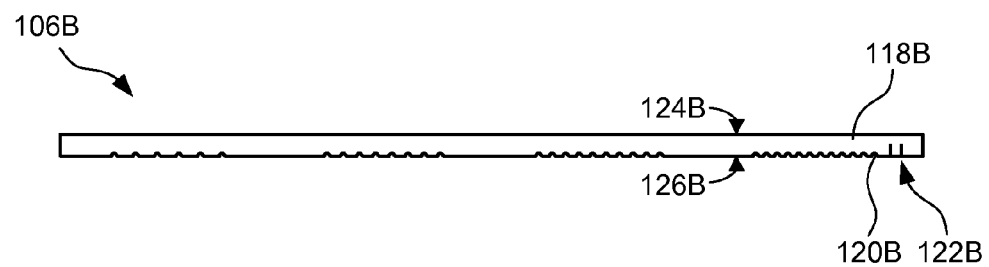
FIG. 1B depicts a sectional diagram of another embodiment of a light guide which has a surface feature pattern formed by depressions, or dimples, in the bottom surface of the substantially translucent layer.

Each surface feature pattern includes a plurality of nonplanar surface features such as raised portions (as shown in FIG. 1A) or depressions (i.e., indentations or dimples, as shown in FIG. 1B) which are out-of-plane with a major surface of the substantially translucent layer. It should be noted that the term "out-of-plane" as used in reference to the top and bottom surfaces 124A and 126A means that the individual surface features extend out of or into the corresponding top or bottom surfaces 124A and 126A of the substantially translucent layer 118A. However, the description of out-of-plane surface features does not require that the substantially translucent layer 118A be disposed in a planar configuration. Rather, flexible or deformable embodiments of the substantially translucent layer 118A may be bent or deformed, even though the surface features extend out of or into the corresponding top or bottom surfaces 124A and 126A of the substantially translucent layer 118A.

As one example of a surface feature pattern, the illustrated embodiment includes raised bumps which protrude out of the plane of the bottom surface 126A of the substantially translucent film 118A. In other embodiments, the surface feature patterns 120A could include a pattern of dimples, or depressions, that penetrate above the plane of the bottom surface 126A of the substantially translucent film 118A. FIG. 1B depicts a sectional diagram of another embodiment of a light guide 106B which has a surface feature pattern 120B formed by depressions, or dimples, in the bottom surface 126B of the substantially translucent layer 118B.

In general, each surface feature pattern 120A/120B disrupts the TIR within the substantially translucent layer 118A/118B. The change in surface area and angle of incidence resulting from the raised or depressed surface features allows at least some of the light in the substantially translucent layer 118A/118B to exit the substantially translucent layer 118A/118B at approximately the locations of the surface feature patterns 120A/120B. In FIG. 1A, the exiting light is shown by the arrows pointing away from the surface feature patterns 120A and towards the back side of the keypad 102. Since some of the light exits at each of the surface feature patterns 120A and, hence, the amount of light that is internally reflected diminishes as the light propagates away from the light source 108, the surface feature patterns 120A of the depicted light guide 106A have different pattern densities. In particular, the surface feature patterns 120A are less dense (i.e., spread apart) near the light source 108 and more dense (i.e., closer together) farther away from the light source 108. The less dense surface feature patterns near the light source 108 provide a relatively small disruption to the TIR and, hence, allow a relatively small amount of the total light to escape, because the amount of total light in the substantially translucent layer 118A is relatively high near the light source. Conversely, the denser surface feature patterns 120A farther away from the light source 108 provide a relatively large disruption to the TIR and, hence, allow a relatively large amount of the total light to escape, because the total light in the substantially translucent layer 118A is relatively low farther away from the light source 108 (due to the light which exits at each of the surface feature patterns 120A which are closer to the light source 108).

In the illustrated embodiment of FIG. 1A, the cut lines 122A are located approximately adjacent to the surface feature pattern 120A that is farthest away from the light source 108. Specifically, the cut lines 122A are located so that the surface feature pattern 120A is between the cut lines 122A and the light source 108. The depicted embodiment includes two cut lines 122A. However, other embodiments may include a single cut line 122A or more than two cut lines 122A.

Each cut line 122A is a physical depression, or channel that has a length, L, a width, W, and a depth, D. In mathematical terms, the length is much greater than the width (i.e., $L \gg W$). Thus, the geometrical shape of the physical depression is a line, either straight or curvilinear (i.e., curved), or a combination of straight and curvilinear, when viewed along the top or bottom surfaces 124A and 126A of the substantially translucent layer 118A. Generally, the length of each cut line 122A corresponds to the size of the area toward which light is directed. The width of each cut line 122A depends on the size and configuration of the tool used to form the cut line 122A. For example, the size of a cut line 122A formed by a die cut knife (not shown) depends on the size and shape of the die cut knife. One example knife width is about 0.04 mm, although any size of die cut knife or other tool may be used. The depth of the cut lines 122A may vary. The depth of each cut line 122A can be expressed as a percentage of the total thickness of the substantially translucent layer 118A. In some embodiments, the depth of each cut line 122A is about two thirds of the total thickness of the substantially translucent layer 118A.

In other embodiments, the depth of the cut line 122A is more or less than about two thirds of the total thickness of the substantially translucent layer 118A. For example, some embodiments may implement cut lines 122A that extend through the entire thickness of the substantially translucent layer 118A, although such a through cut may alter the physical stability of the substantially translucent layer 118A. Additionally, embodiments which implement multiple cuts lines 122A may perform as well as embodiments which use through cuts, without as drastic of an impact on the physical stability of the substantially translucent layer 118A. The minimum displacement between multiple cut lines 122A arranged within a group of cut lines 122A depends on the precision of the tools used to create the cut lines 122A.

In general, the cut lines 122A redirect at least some of the light towards one or more of the surface feature patterns 120A. In particular, the cut lines 122A may act like a reflective mirror to reflect light from a first direction (e.g., traveling away from a surface feature pattern 120A) so that the light is redirected towards a second direction (e.g., traveling back towards the surface feature pattern 120A). In another embodiment, the cut lines 122A redirect light from a direction passing by a surface feature pattern 120A to a different direction towards the surface feature pattern 120A. In at least one embodiment, the cut lines 122A redirect light from the beam distribution pattern of the light source 108 to a surface feature pattern 122A that is outside of the beam distribution pattern of the light source 108. By redirecting the light towards the surface feature patterns 120A of the light guide 106A, embodiments of the light guide 106A can provide better backlight illumination for the keypad 102, compared with conventional light guides that do not use such cut lines.

In one embodiment, at least a portion of a cut line 122A extends into the substantially transparent layer 118A of the light guide 108 approximately at a right angle relative to at least on one of the top and bottom surfaces 124A and 126A of the substantially transparent layer 118A. For example, the cut lines of FIG. 1A are shown extending perpendicularly into the bottom surface 126A of the substantially transparent layer 118A of the light guide 106A. Other examples of right angles and different angles are provided in the various examples shown herein and described below.

Figure 2:
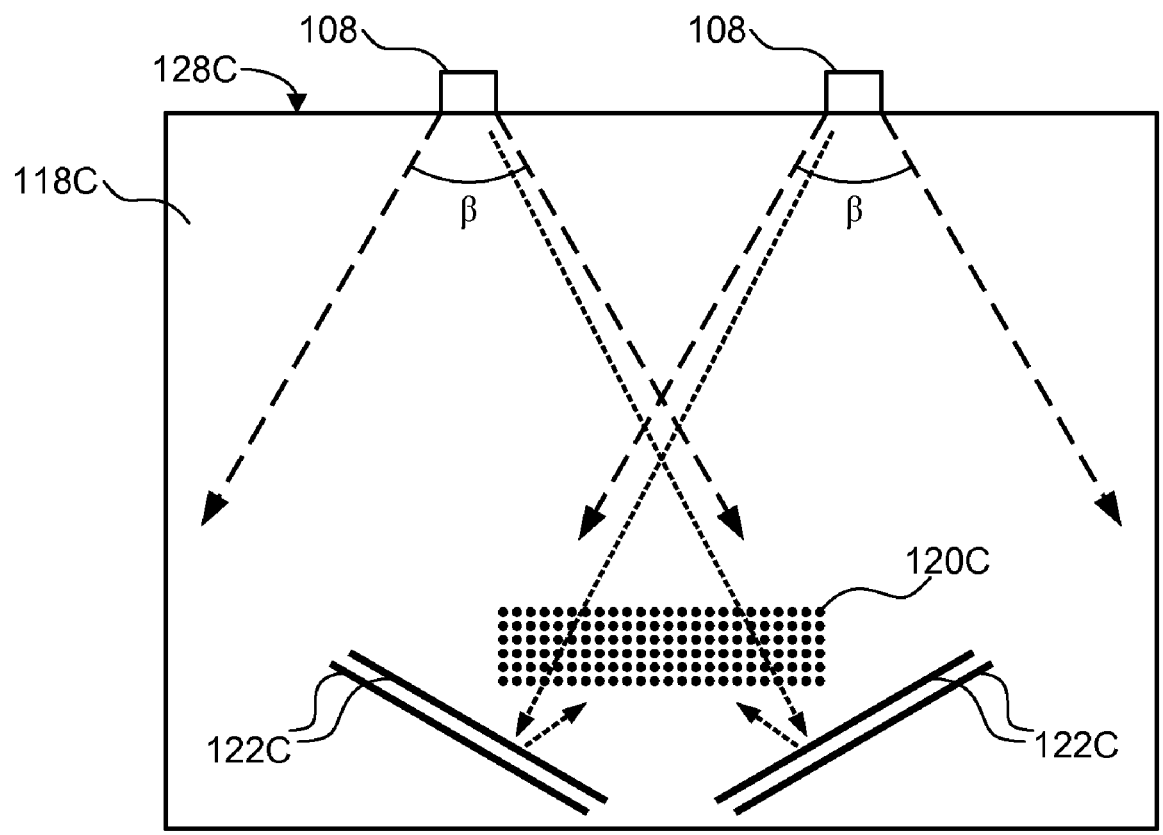
FIG. 2 depicts a schematic diagram of one embodiment of multiple light sources and a light guide film, including cut lines to reflect light back towards a surface feature pattern.

FIG. 2 depicts a schematic diagram of one embodiment of multiple light sources 108 and a light guide film 118C, including cut lines 122C to reflect light back towards a surface feature pattern 120C. Each of the light sources 108 emits light into the light guide film 118C through the light interface surface 128C. As described above, the light sources 108 may be any type of light sources, including LEDs. Each light source 108 has a beam distribution pattern, which is designated by the dashed arrows and a corresponding beam width, β. Thus, certain portions of the light guide film 118C are directly illuminated by the light emitted from the light sources 108, while other portions (e.g., the top corners in the configuration of FIG. 2) of the light guide film 118C are not directly illuminated by the light from the light sources 108.

In the illustrated embodiment, four cut lines 122C are arranged in pairs on either side of the surface feature pattern 120C. Each pair of cut lines 122C is arranged so that the cut lines 122C are parallel to one another. However, in other embodiments, the cut lines 122C may be in another non-parallel arrangement. Also, the cut lines 122C in each pair are arranged in an order of increasing distance away from the light interface surface 128C. In other words, in each pair of cut lines 122C, one cut line 122C is farther away than the other cut line 122C from the light interface surface 128C. Also, the cut lines 122C depicted in FIG. 2 are linear because the cut lines 122C are substantially straight along the corresponding surface of the light guide film 118C. As light from the light sources 108 reaches the surface feature pattern 120C, the surface feature pattern 120C disrupts the TIR of the light guide film 118C and, hence, allows some of the light to exit from the light guide film 118C. However, some of the light (shown by the dotted arrows) passes by the region at the surface feature pattern 120C and continues to propagate towards the cut lines 122C. Upon reaching the cut lines 122C, the light is reflected back towards the surface feature pattern 120C, which allows additional light to exit from the light guide film 118C at the region of the surface feature pattern 120C. As a result, the amount of light that exits the light guide film 118C at the region of the surface feature pattern 120C is increased due to the light reflected back towards the surface feature pattern 120C by the cut lines 122C.

Figure 3:
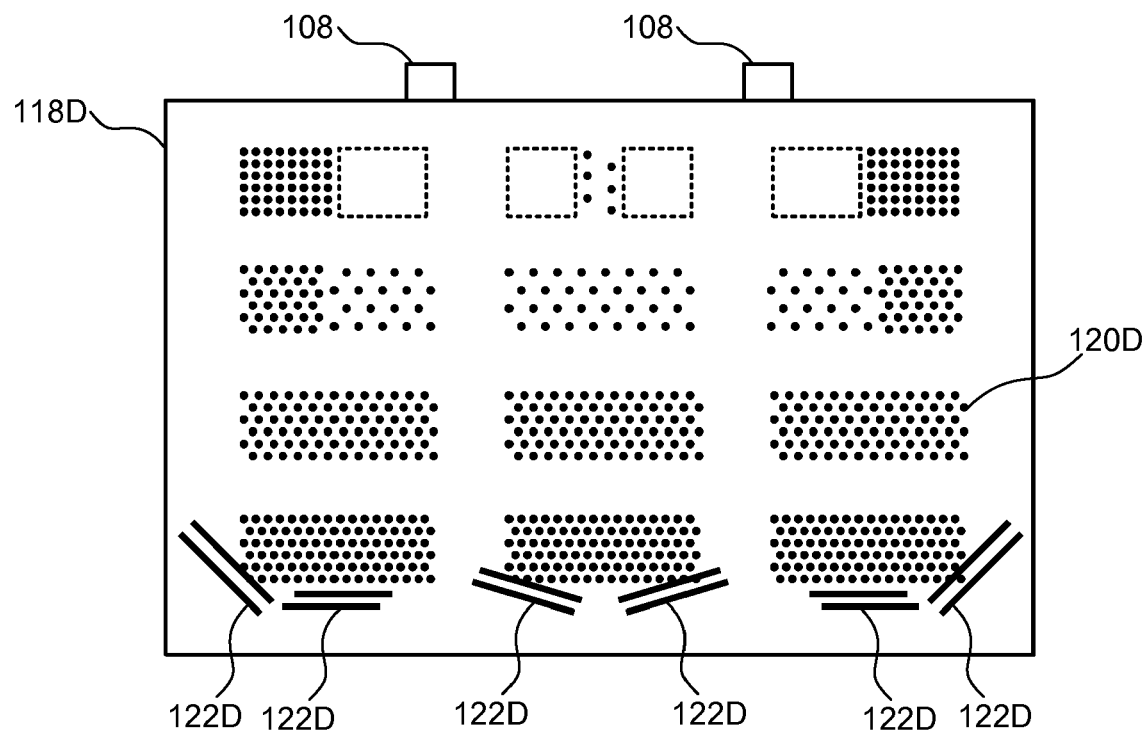
FIG. 3 depicts a schematic diagram of another embodiment of the light sources and the light guide film, including multiple surface feature patterns and corresponding cut lines.

FIG. 3 depicts a schematic diagram of another embodiment of the light sources 108 and the light guide film 118D, including multiple surface feature patterns 120D and corresponding cut lines 122D. In the depicted embodiment, the surface feature patterns 120D have varying densities, which affects the amount of light that exits the light guide film 118D at each surface feature pattern 120D. For reference, each surface feature pattern 120D, or corresponding area, correlates to one or more keys on the keypad 102 (refer to FIG. 1A). Also, it should be noted that some of the areas which correlate to keys on the keypad 102 do not have surface feature patterns 120D and, hence, are shown in FIG. 3 with simply a dashed box at a portion or all of the corresponding area.

As in the previous example of FIG. 2, the cut lines 122D in the embodiment shown in FIG. 3 reflect light back towards one or more of the surface feature patterns 120D. As a result, the amount of light that exits the light guide film 118D at the various regions of the surface feature patterns 120D may be increased due to the light reflected back towards the surface feature pattern 120D by the cut lines 122D. At least some of the cut lines 122D may be produced so that the cut lines 122D are substantially perpendicular to the direction of propagation of the light from the light sources 108. Other embodiments may use cut lines 122D that are not perpendicular to the direction of propagation of the light from the light sources 108.

Figure 4:
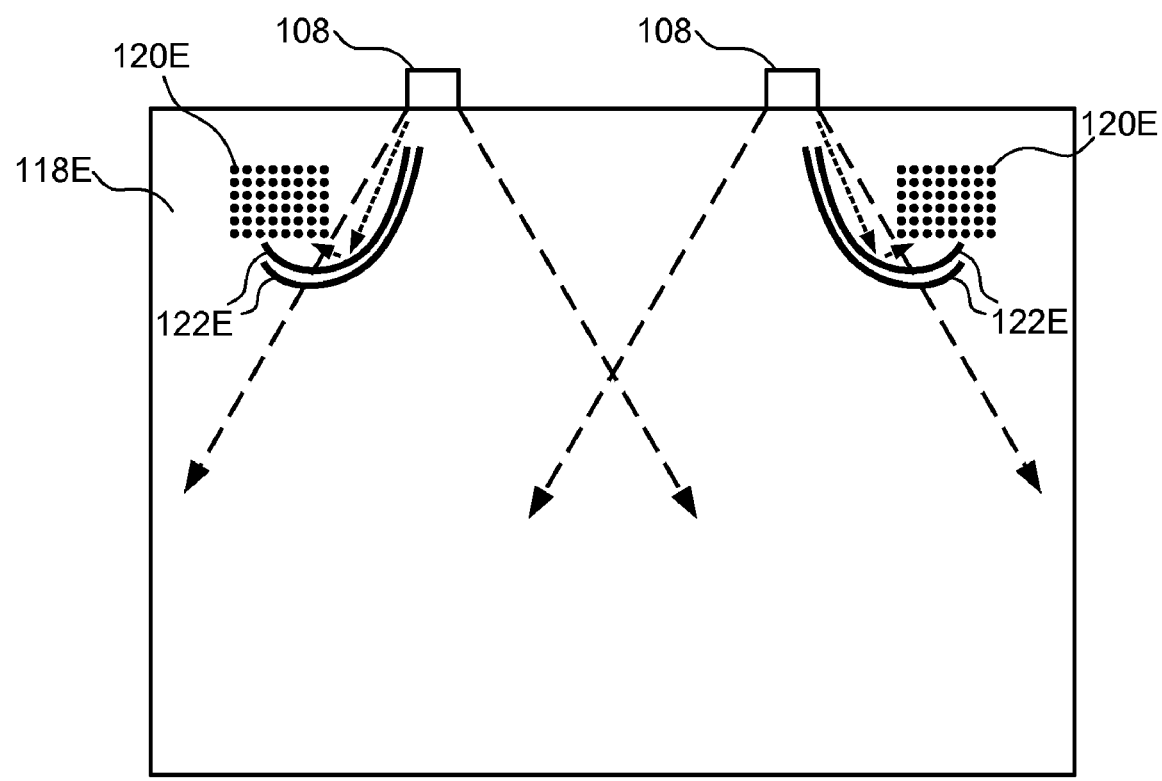
FIG. 4 depicts a schematic diagram of another embodiment of the light sources and the light guide film, including cut lines to reflect light towards surface feature patterns which are outside of the anticipated beam distribution pattern of the light sources.

FIG. 4 depicts a schematic diagram of another embodiment of the light sources 108 and the light guide film 118E, including cut lines 122E to reflect light towards surface feature patterns 120E which are outside of the anticipated beam distribution pattern of the light sources 108. In particular, the surface feature patterns 120E are located in the top corners of the light guide film 118E, in the drawing view. Due to the locations of the surface feature patterns 120E, the surface feature patterns 120E do not receive a substantial amount of light directly from the light sources 108. Rather, conventionally, the light that reaches these surface feature patterns 120E depends on reflections within the light guide film 118E. However, the curvilinear cut lines 122E in the light guide film 118E increase the amount of light that is redirected towards the surface feature patterns 120E that are outside of the beam distribution pattern of the light sources 108. Specifically, light emitted from the light sources 108 is incident on portions of the cut lines 122E and, hence, reflects off of the cut lines 122E and propagates towards the surface feature patterns 120E. As a result, the amount of light that exits the light guide film 118E at the corresponding regions of the surface feature patterns 120E may be increased due to the light reflected back towards the surface feature patterns 120E by the cut lines 122E.

Figure 5:
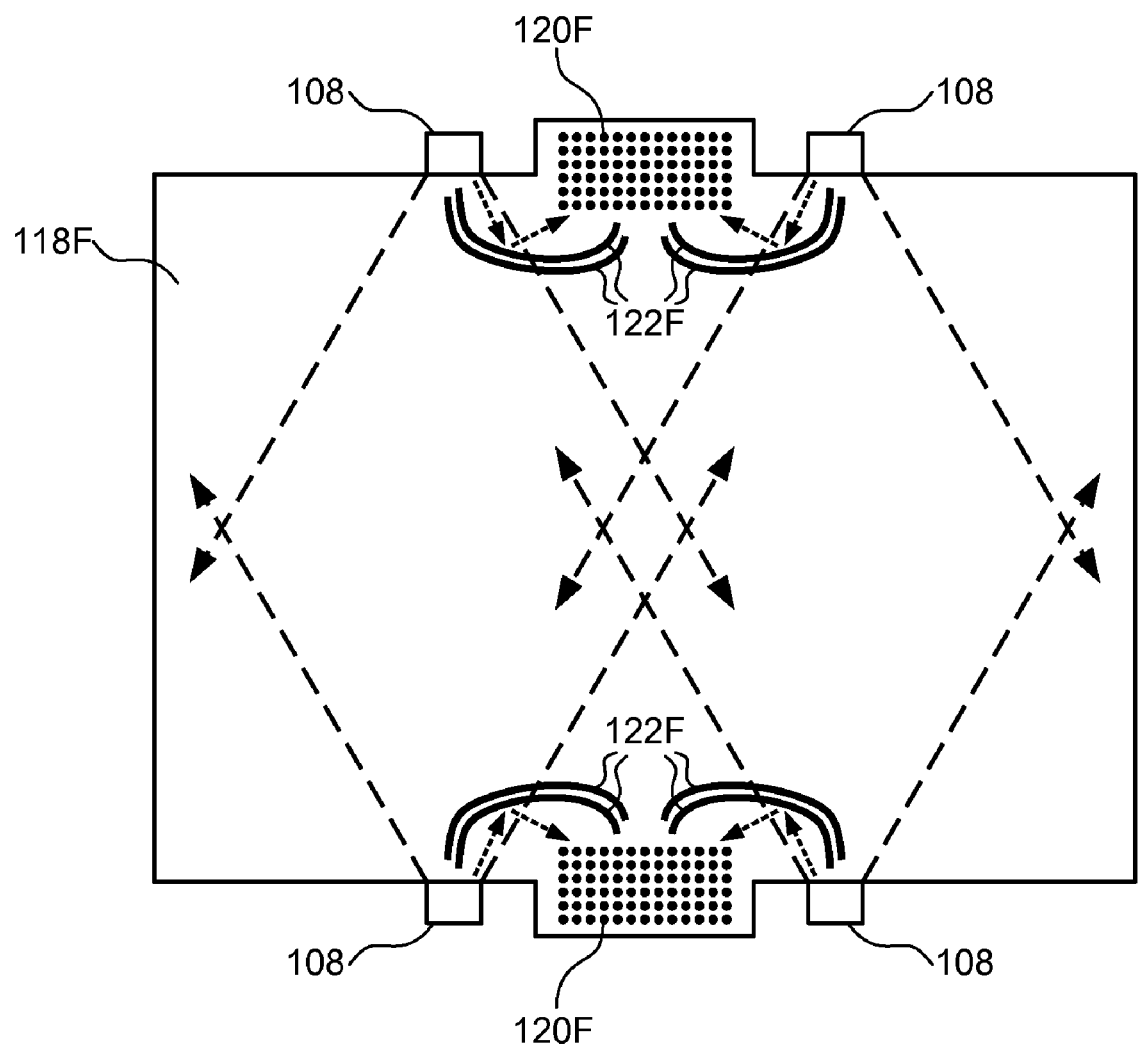
FIG. 5 depicts a schematic diagram of another embodiment of the light sources and the light guide film, including cut lines to reflect light towards surface feature patterns which are substantially between pairs of adjacent light sources and outside of the anticipated beam distribution pattern of the adjacent light sources.

FIG. 5 depicts a schematic diagram of another embodiment of the light sources 108 and the light guide film 118F, including cut lines 122F to reflect light towards surface feature patterns 120F which are substantially between pairs of adjacent light sources 108 and outside of the anticipated beam distribution pattern of the adjacent light sources 108. While there are light sources 108 on opposite sides of the light guide film 118F, it should be noted that the direct illumination received from the opposing light sources 108 (i.e., located across the length of the light guide film 118F) may be insufficient to provide enough backlight illumination for the regions corresponding to the depicted surface feature patterns 120F.

Similar to the embodiment of FIG. 4, the curvilinear cut lines 122F of FIG. 5 redirect some of the light from the typical beam distribution patterns of the adjacent light sources 108 towards the surface feature patterns 120F between the adjacent light sources 108. As a result, the amount of light that exits the light guide film 118F at the corresponding regions of the surface feature patterns 120F may be increased due to the light reflected back towards the surface feature patterns 120F by the cut lines 122F.

FIGS. 6A-H depict schematic cross-sectional diagrams of various embodiments of cut lines 122G-122N within the light guide film 118G-118N of an optical keypad system 100. As illustrated in each of the figures, the light guide film 118G-118N has a top surface 124G-124N, a bottom surface 126G-126N, and a light interface surface 128G-128N through which light generally enters the light guide film 118G-118N. As explained above, the light inside the light guide film 118G-118N generally propagates through the length of the light guide film 118G-118N by reflecting according to TIR off of the top and bottom surfaces 124G-124N and 126G-126N of the light guide film 118G-118N, to the extent that the TIR is not disrupted by one or more surface feature patterns 120G-120N.

Figure 6A:
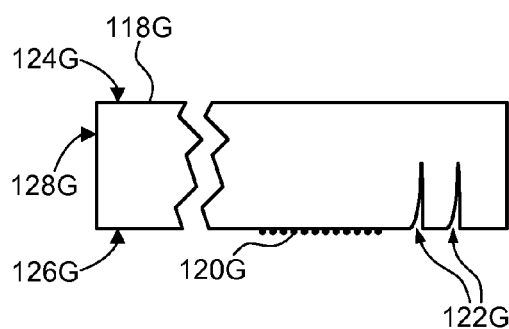
FIGS. 6A-H depict schematic cross-sectional diagrams of various embodiments of cut lines within the light guide film of an optical keypad system.
Figure 6B:
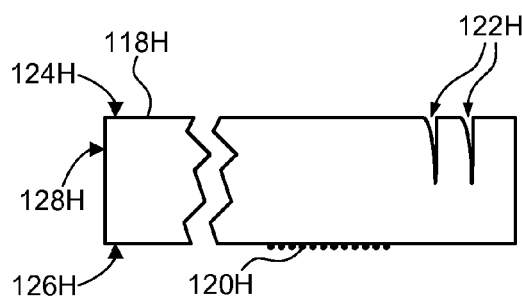
Figure 6C:
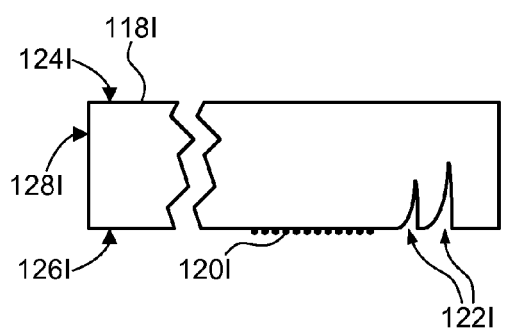
Figure 6D:
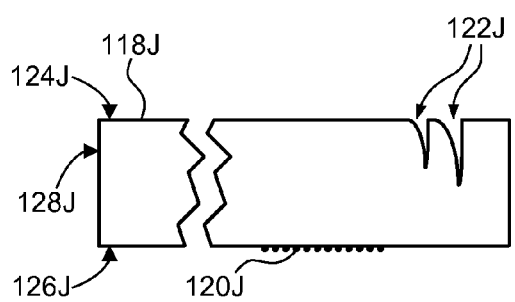
Figure 6E:
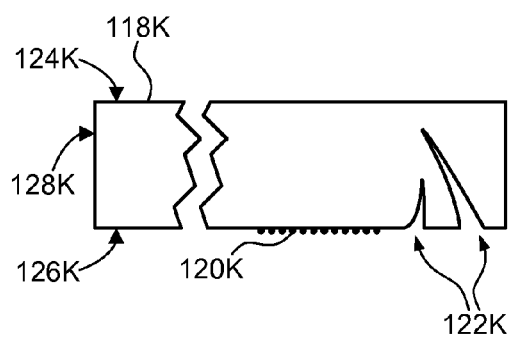
Figure 6F:
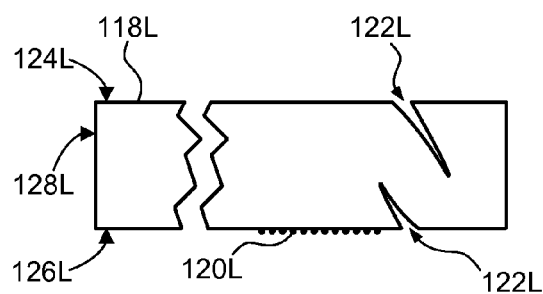
Figure 6G:
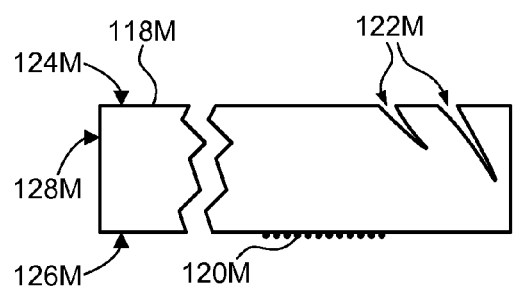
Figure 6H:
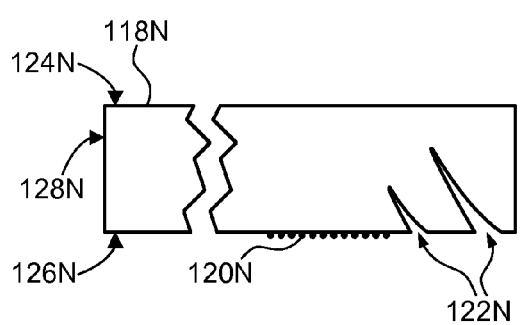

In the embodiment shown in FIG. 6A, two cut lines 122G are located approximately adjacent to a surface feature pattern 120G. The cut lines 122G of FIG. 6A are formed in the same surface (i.e., the bottom surface 126G) as the surface feature pattern 120G. However, other embodiments may implement cut lines 122G in other surfaces of the light guide film 118G. For example, FIGS. 6B, 6D, and 6G show cut lines 122H, 122J, 122M in the top surface 124H, 124J, 124M of the light guide film 122H, 122J, 122M, which is the opposite surface from where the surface feature pattern 120H, 120J, 120M is disposed. As other example, FIG. 6F shows cut lines 122L in both the top and bottom surfaces 124L and 126L of the light guide film 118L. Although FIG. 6F shows a single cut line 122L in each of the top and bottom surfaces 124L and 126L, other embodiments may implement more than one cut line 122L in one or both of the top and bottom surfaces 124L and 126L.

Also, the cut lines 122G of FIG. 6A are approximately the same shape and size (e.g., width and depth). However, other embodiments may implement cut lines 122 of different shapes and sizes. For example, the cut lines 122I and 122J of FIGS. 6C and 6D are of different sizes. In particular, the cut line 122I and 122J closest to the surface feature pattern 120I and 120J is smaller than the farther cut line 122I and 122J. As other examples, the cut lines 122K-122N of FIGS. 6E through 6H show cut lines 122K-122N that are different sizes and shapes.

Also, the cut lines 122G of FIG. 6A penetrate the light guide film 118G at approximately right angles relative to the top surface 124G of the light guide film 118G. Other embodiments may penetrate the light guide film at angles other than right angles. For example, FIGS. 6E through 6H show cut lines 122K-122N that are at angles that are not perpendicular relative to the top and bottom surfaces 124K-124N and 126K-126N. Also, FIG. 6E shows cut lines 122K that are at different angles relative to one another.

Figure 7:
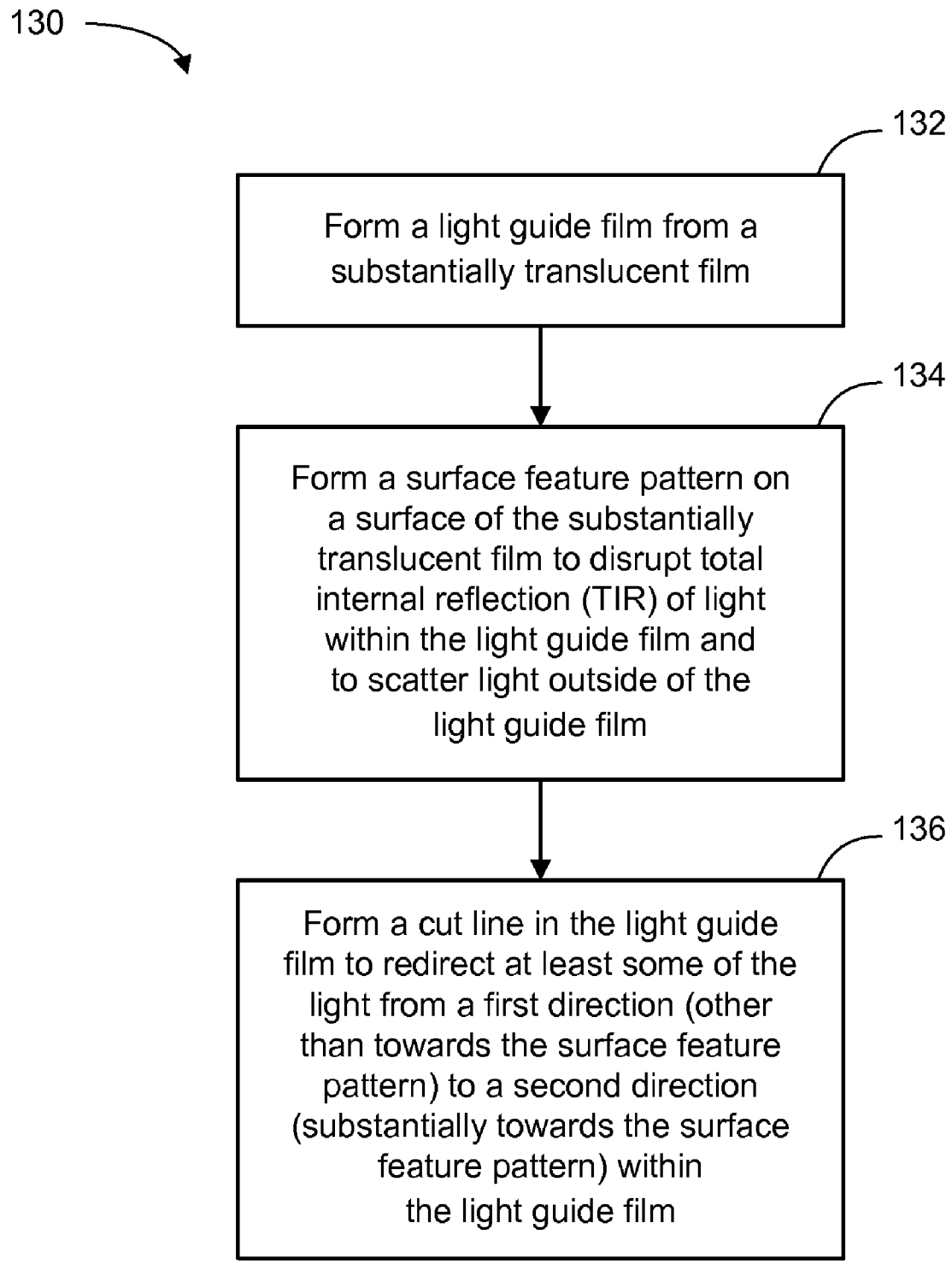
FIG. 7 depicts a flow chart diagram of one embodiment of a method for making a light guide film for backlighting an optical keypad.

FIG. 7 depicts a flow chart diagram of one embodiment of a method 130 for making a light guide film 118C for backlighting an optical keypad 102. Although the method 130 is described in conjunction with the light guide film 118C of FIG. 2, embodiments of the method 130 may be implemented with other types of light guides, optical keypad systems, and/or backlighting systems.

At block 132, a light guide film 118C is formed from a substantially translucent film. At block 134, a surface feature pattern 120C is formed on a surface of the substantially translucent film. As explained above, the surface feature pattern 120C disrupts the TIR of light within the light guide film 118C. Hence, the surface feature pattern 120C facilitates scattering of light outside of the light guide film 118C. At block 136, a cut line 122C is formed in the light guide film 118C. The cut line 122C redirects at least some of the light from a first direction to a second direction within the light guide film 118C. In some embodiments, the light is redirected from a direction other than towards the surface feature pattern 120C to a direction towards the surface feature pattern 120C. As a result, the amount of light that exits the light guide film 118C at the corresponding region of the surface feature pattern 120C may be increased due to the light reflected back towards the surface feature pattern 120C by the cut line 122C.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A light guide comprising:
   a light interface surface to receive light into the light guide from a light source;
   top and bottom surfaces, wherein the light received through the light interface surface reflects according to total internal reflection (TIR) within the light guide between portions of the top and bottom surfaces;
   a surface feature pattern to disrupt the TIR and to scatter at least some of the light outside of at least one surface of the top and bottom surfaces; and
   a cut line to redirect at least some of the light from a first direction to a second direction within the light guide, wherein the first direction is a direction other than towards the surface feature pattern, and the second direction is a direction substantially towards the surface feature pattern according to the TIR, and wherein the cut line comprises:
      an elongated opening in at least one surface of the top and bottom surfaces; and
      a channel aligned with the elongated opening, wherein the channel forms an empty cavity which extends into the light guide toward an opposing surface, and the channel has converging sidewalls which taper from opposite sides of the elongated opening to a depth at which the sidewalls converge within the light guide, wherein the depth is less than a thickness of the light guide.

2. The light guide of claim 1, wherein the cut line comprises a physical depression in one of the top and bottom surfaces of the light guide, wherein the physical depression has a length, L, and a width, W, wherein a smallest dimension of the length is greater than a largest dimension of the width.

3. The light guide of claim 1, wherein at least a portion of the cut line in at least one dimension is approximately perpendicular to a propagation direction of the light within the light guide.

4. The light guide of claim 1, wherein at least a portion of the cut line extends into the light guide approximately at a right angle relative to at least one of the top and bottom surfaces of the light guide.

5. The light guide of claim 1, wherein the surface feature pattern is substantially between the light interface surface and the cut line, and wherein the cut line is located and configured to redirect at least some of the light back towards the surface feature pattern.

6. The light guide of claim 1, wherein the surface feature pattern is at least partially outside of a beam distribution pattern of the light source, and wherein the cut line is at least partially located within the beam distribution pattern of the light source, wherein the cut line is configured to redirect at least some of the light towards the surface feature pattern outside of the beam distribution pattern of the light source.

7. The light guide of claim 1, further comprising a plurality of cut lines, wherein the plurality of cut lines comprises at least one group of multiple cut lines arranged approximately parallel to one another and in an order of increasing distance away from the light interface surface.

8. The light guide of claim 1, wherein the cut line is substantially linear along at least one of the top and bottom surfaces.

9. The light guide of claim 1, wherein the cut line is substantially curvilinear along at least one of the top and bottom surfaces.

10. The light guide of claim 1, wherein the light guide comprises a flexible light guide film.

11. An optical keypad system for an electronic computing device, the optical keypad system comprising:
a keypad with a plurality of push buttons corresponding to a plurality of inputs, wherein at least a portion of the keypad is at least partially translucent;
a light guide film located approximately adjacent to a back side of the keypad, wherein the light guide film comprises:
a light interface surface to receive light into the light guide film;
a surface feature pattern on at least one surface of the light guide film approximately parallel to the back side of the keypad, the surface feature pattern to disrupt total internal reflection (TIR) within the light guide film and to scatter at least some of the light outside of the light guide film towards the keypad; and
a cut line to redirect at least some of the light from a first direction to a second direction within the light guide film, wherein the first direction is a direction other than towards the surface feature pattern, and the second direction is a direction substantially towards the surface feature pattern according to the TIR, and wherein the cut line comprises:
an elongated opening in at least one surface of the top and bottom surfaces; and
a channel aligned with the elongated opening, wherein the channel forms an empty cavity which extends into the light guide toward an opposing surface, and the channel has converging sidewalls which taper from opposite sides of the elongated opening to a depth at which the sidewalls converge within the light guide, wherein the depth is less than a thickness of the light guide; and
a light source to emit the light towards the light interface surface of the light guide film.

12. The optical keypad system of claim 11, wherein the cut line comprises a physical depression in one of top and bottom surfaces of the light guide film, wherein the physical depression has a length, L, and a width, W, wherein a smallest dimension of the length is greater than a largest dimension of the width.

13. The optical keypad system of claim 11, wherein at least a portion of the cut line in at least one dimension is approximately perpendicular to a propagation direction of the light within the light guide film.

14. The optical keypad system of claim 11, wherein the surface feature pattern is substantially between the light interface surface and the cut line, and wherein the cut line is located and configured to redirect at least some of the light back towards the surface feature pattern.

15. The optical keypad system of claim 11, wherein the surface feature pattern is at least partially outside of a beam distribution pattern of the light source, and wherein the cut line is at least partially located within the beam distribution pattern of the light source, wherein the cut line is configured to redirect at least some of the light towards the surface feature pattern outside of the beam distribution pattern of the light source.

16. The optical keypad system of claim 11, further comprising a plurality of cut lines, wherein the plurality of cut lines comprises at least one group of multiple cut lines arranged approximately parallel to one another and in an order of increasing distance away from the light interface surface of the light guide film.

17. A method for making a light guide for backlighting an optical keypad, the method comprising:
forming a light guide film from a substantially translucent film, wherein the light guide film comprises a light interface surface to receive light from a light source;
forming a surface feature pattern on a surface of the substantially translucent film, wherein the surface feature pattern is configured to disrupt total internal reflection (TIR) of light within the light guide film and to scatter at least some of the light outside of the light guide film; and
forming a cut line in the light guide film, the cut line to redirect at least some of the light from a first direction to a second direction within the light guide film, wherein the first direction is a direction other than towards the surface feature pattern, and the second direction is a direction substantially towards the surface feature pattern according to the TIR, and wherein the cut line comprises:
an elongated opening in at least one surface of the top and bottom surfaces; and
a channel aligned with the elongated opening, wherein the channel forms an empty cavity which extends into the light guide toward an opposing surface, and the channel has converging sidewalls which taper from opposite sides of the elongated opening to a depth at which the sidewalls converge within the light guide, wherein the depth is less than a thickness of the light guide.

18. The method of claim 17, wherein the cut line comprises a physical depression in one of top and bottom surfaces of the light guide film, wherein the physical depression has a length, L, and a width, W, wherein a smallest dimension of the length is greater than a largest dimension of the width.

19. The method of claim 17, wherein forming the cut line further comprises locating the cut line so that the surface feature pattern is substantially between the light interface surface and the cut line, and wherein the cut line is located and configured to redirect at least some of the light back towards the surface feature pattern.

20. The method of claim 17, wherein forming the cut line further comprises locating the cut line so that the cut line is at least partially located within a beam distribution pattern of the light source at the light interface surface, while the surface feature pattern is at least partially outside of the beam distribution pattern of the light source, wherein the cut line is configured to redirect at least some of the light towards the surface feature pattern outside of the beam distribution pattern of the light source.

* * * * *